United States Patent Office 3,226,755
Patented Jan. 4, 1966

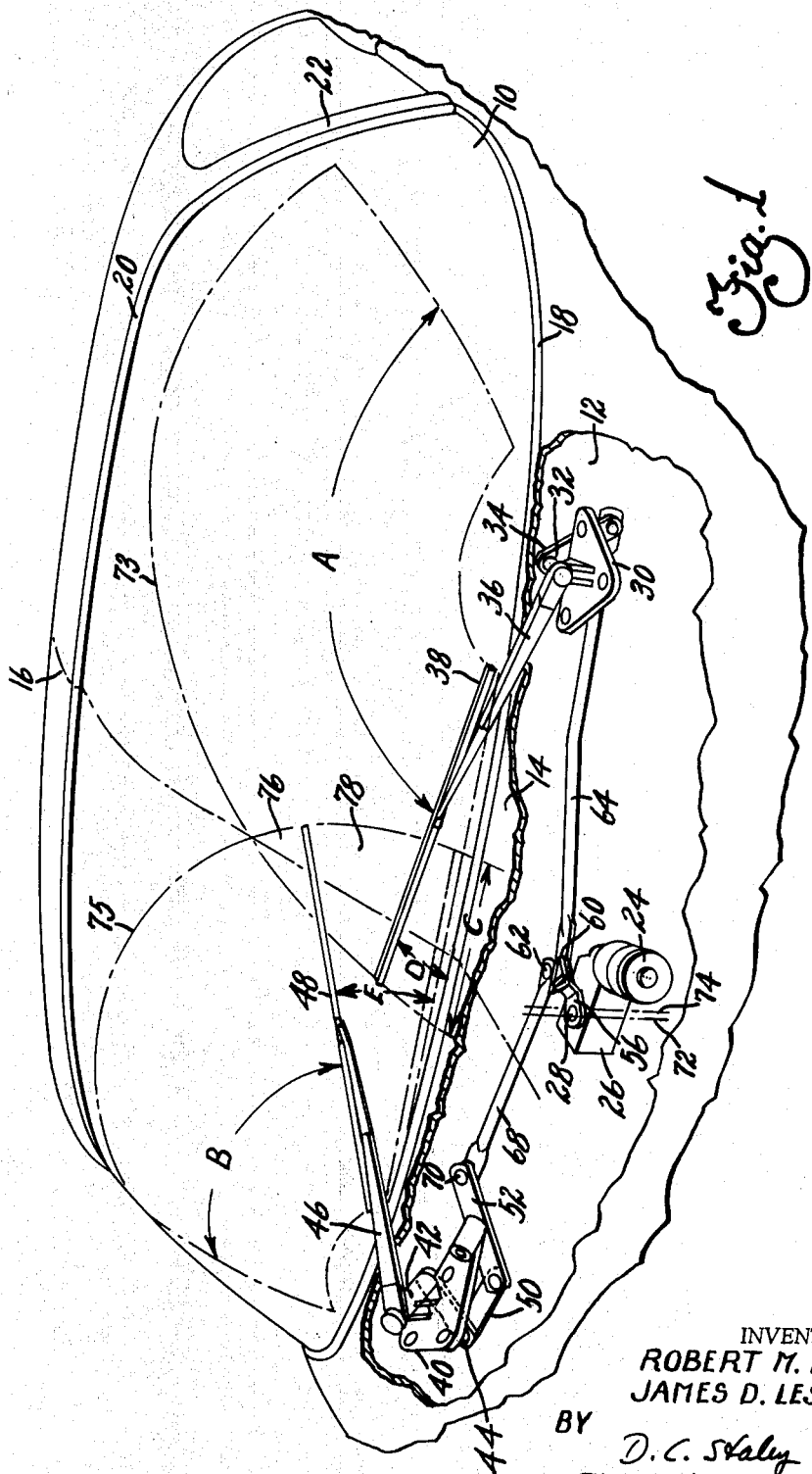

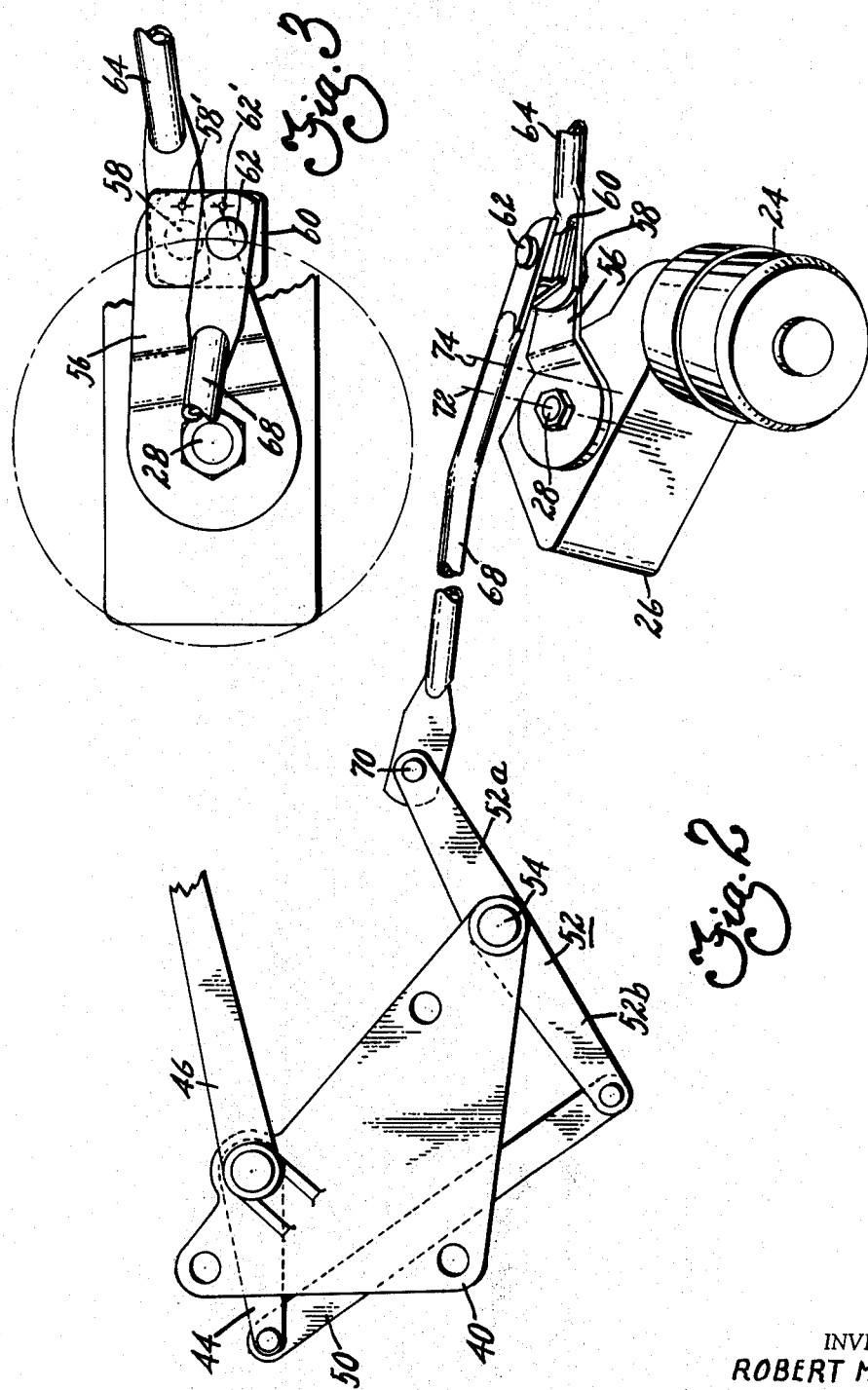

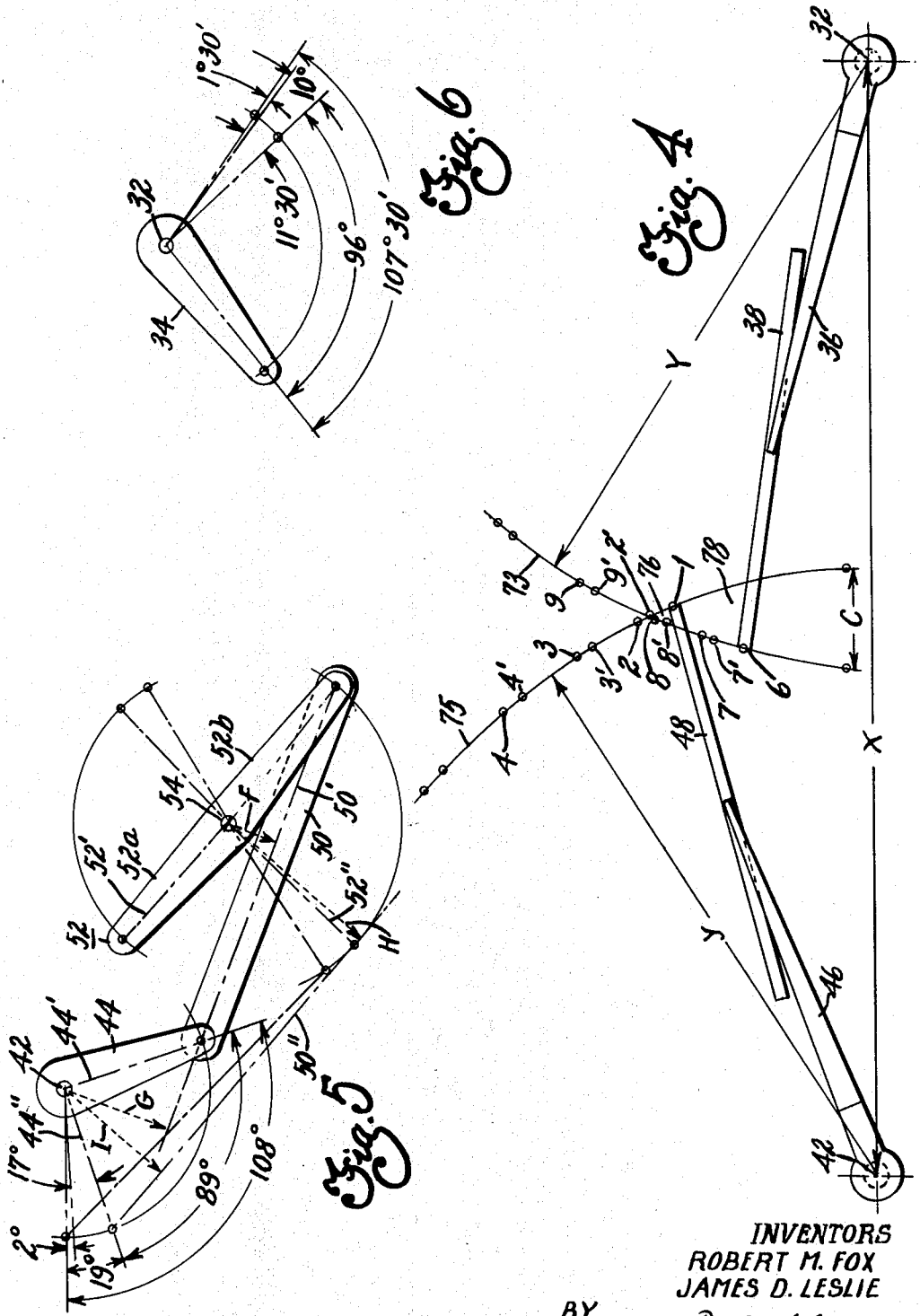

3,226,755
WINDSHIELD WIPER MECHANISM
Robert M. Fox, Detroit, and James D. Leslie, Birmingham, Mich., assignors to General Motors Corporation, Detroit, Mich., a corporation of Delaware
Filed Aug. 20, 1958, Ser. No. 756,097
19 Claims. (Cl. 15—250.14)

This invention pertains to windshield wiper mechanism, and particularly to means for increasing the wiped area of a windshield with a pair of asymmetrically oscillated wiper blades.

Heretofore, numerous arrangements have been devised for increasing the area of a windshield that is wiped by a wiper blade. However, prior mechanisms are not adapted for use with conventional wiping means comprising a pair of spaced, asymmetrically oscillated wiper blades. The present invention relates to windshield wiper mechanism including a pair of asymmetrically oscillated wiper blades having an overlapping wiping pattern adjacent their inboard stroke ends so as to substantially increase the wiper area of the windshield. Accordingly, among our objects are the provision of windshield wiping mechanism including a pair of asymmetrically oscillated overlapping wiper blades; the further provision of means for asymmetrically oscillating a pair of overlapping wiper blades without interference; and the still further provision of a wiper drive linkage means for imparting asymmetrical oscillation to a pair of spaced apart wiper blades from rotary crank means to obtain an overlapping wiping pattern adjacent the inboard stroke ends.

The aforementioned and other objects are accomplished in the present invention by incorporating an offset crank assembly in the drive linkage in combination with means for imparting nonuniform angular velocity to the upper wiper blade. Specifically, the wiper mechanism may be driven from any suitable power source such as a fluid pressure operated motor, a mechanically driven rotary crank assembly, or an electric motor. In the disclosed embodiment, the wiper mechanism is driven by an electric motor and includes a variable throw crank assembly of the type disclosed in copending application Serial No. 718,789 filed March 3, 1958, in the name of Peter R. Contant et al., and assigned to the assignee of this invention, now Patent No. 2,985,024. Thus, the motor drive includes eccentric means for shifting the axis of the rotary crank shaft assembly after substantially arresting the rotation of the crank shaft assembly so as to increase the throw of the crank assembly to achieve depressed parking of the wiper blades.

The motor driven crank shaft has a first crank arm attached thereto carrying a crank pin at its outer end. A second crank arm is attached to the first crank pin and oriented at a fixed angle relative thereto, the second crank arm carrying a second crank pin. The two crank arms constitute an offset crank assembly, the crank pins of which are located on the same side of the axis of the rotating shaft. The inner ends of a pair of connecting links are rotatably connected to the two crank pins. The outer end of one connecting link is connected through a ball and socket joint to a crank arm attached to the pivot, or wiper, shaft located on the driver's side of the vehicle. The outer end of the other connecting link is connected through a ball and socket joint to one end of a reversing link, or bellcrank, having a fixed intermediate pivot point. The other end of the reversing link is rotatably connected to one end of a connecting arm, the other end of the connecting arm being rotatably connected to a crank arm attached to the pivot, or wiper, shaft on the passenger's side of the vehicle. The reversing link on the passenger's side of the vehicle reverses the motion so that the two spaced wiper shafts will be oscillated asymmetrically during rotation of the crank assembly.

Heretofore, it has been the practice to space the wiper shafts so that the wiper blades which are carried by the wiper arms that are drivingly connected to the wiper shafts, are spaced slightly apart adjacent the center line of the vehicle when the wiper blades are in their depressed parked positions. However, since present day windshields not only wrap around the side portion of the vehicle but also extend into the top thereof, in order to wipe a sufficient area of the windshield to afford the driver proper vision, it has become necessary, in some instances, to increase the length of the wiper blades so that the blades overlap adjacent their inboard stroke ends at the center line of the vehicle. This type of overlapping blade system is necessary in vehicles where the location of the pivot shafts cannot be adjusted so as to accommodate the additional length of the blades due to interference of the blades with the side rails, or windshield pillars.

In order to use overlapping wiper blades, means must be provided for preventing interference between the blades at their inboard stroke ends, where their wiping patterns overlap. In addition, means must be provided for firmly maintaining the lower blade in engagement with the reveal molding when the wiper blades are removed to the depressed parked position. In the disclosed embodiment, interference between the overlapping wiper blades at their inboard stroke ends is prevented by providing wiper strokes of unequal angular extent in combination with means for imparting nonuniform angular velocity to the upper wiper blade so that the upper wiper blade has a greater velocity at its inboard stroke end than adjacent its outboard stroke end. In addition, the upper and lower wiper blades have different parking angles, that is the angle between the inboard stroke ends of the wiper blades and the depressed parked positions differ with the upper blade having the larger parking angle. Moreover, in order to maintain the lower wiper blade in firm engagement with the lower reveal molding of the windshield, both the upper and lower blades are overparked, that is, the angular distance between their inboard stroke ends and the lower reveal molding is less than the parking angle. The means for accomplishing the aforementioned operations include the offset crank assembly and the geometrical relationship of the reversing link and the crank arm in the drive linkage for the wiper blade on the passenger's side of the vehicle.

Further objects and advantages of the present invention will be apparent from the following description, reference being had to the accompanying drawings, wherein a preferred embodiment of the present invention is clearly shown.

In the drawings:

FIGURE 1 is a fragmentary perspective view, partly in section and partly in elevation, of a vehicle equipped with the overlapping wiper blade mechanism of this invention.

FIGURE 2 is a fragmentary view in elevation, of the drive linkage for the upper wiper blade.

FIGURE 3 is a fragmentary view in elevation, of the offset crank assembly indicating the position thereof at the inboard stroke end and in the depressed park position.

FIGURE 4 is a diagrammatic view of the overlapping blade system.

FIGURE 5 is a diagrammatic view of the geometry of the drive linkage for the upper wiper blade.

FIGURE 6 is a diagrammatic view of the linkage for the lower wiper blade.

With particular reference to FIGURE 1, a portion of a vehicle is shown including a wrap-around windshield 10, a firewall 12 and a cowl 14. The center line of the vehicle is indicated by broken line 16. In accordance with conventional practice, the vehicle includes a lower reveal molding 18 and an upper reveal molding 20, the upper reveal molding extending downwardly on opposite sides of the vehicle in contiguous relation to the windshield pillars, only one of which, 22, is visible in FIGURE 1.

The wiping mechanism for the windshield 10 comprises an electric motor 24 supported by a gear box housing 26, the motor 24 being capable of imparting rotation to a crank shaft 28, the axis of which is substantially vertical. The gear box housing 26 is suitably attached to the firewall 12. A bracket 30 is suitably attached to the cowl 14 on the driver's side of the vehicle, a pivot shaft 32 being rotatably journalled in the bracket 30. The inner end of the pivot shaft 32 has a drive arm 34 attached thereto. The outer end of the shaft 32 extends through an opening in the cowl, and has a wiper arm 36 drivingly connected therewith. In accordance with conventional practice, the wiper arm 36 may include spring hinge connected inner and outer sections, the outer section of which carries a wiper blade 38 which is spring biased against the outer surface of the windshield 10.

A second bracket 40 is suitably attached to the cowl 14 on the passenger's side of the vehicle. A pivot shaft 42 is rotatably journalled on the bracket 40, the pivot shaft 42 having a drive arm 44 connected to its inner end. A second wiper arm 46 is drivingly connected with the outer end of the pivot shaft 42, the wiper arm 46 likewise including spring hinge connected inner and outer sections, the outer section of which carries a wiper blade 48. The outer end of the drive arm 44 is rotatably connected to one end of a connecting arm 50, the other end of which is rotatably connected to one end of a bellcrank, or reversing link 52. The reversing link 52 has a fixed intermediate pivot shaft 54 carried by the bracket 40.

As seen in FIGURES 2 and 3, the rotary crank shaft 28 has a first crank arm 56 attached thereto which extends on one side of the axis of the shaft 28. The first crank arm 56 carries a crank pin 58 to which a second crank arm 60 having a fixed angular relationship with the crank arm 56, and oriented at an angle thereto is attached. The second crank arm 60 carries a crank pin 62.

The inner end of a first connecting link 64 is rotatably connected to the crank pin 58, the outer end of the connecting link 64 being connected through a ball and socket joint to the drive arm 34. The inner end of a second connecting link 68 is rotatably connected to the crank pin 62, the outer end of the connecting link 68 being connected through a ball and socket joint 70 to the bellcrank 52. The function of the bellcrank, or reversing link 52, is to reverse the motion of the connecting arm 50 so that the wiper shafts 32 and 42 will have imparted thereto asymmetrical oscillation, or oscillation in phase opposition. Moreover, in accordance with the disclosure in the aforementioned copending application Serial No. 718,789, the axis of the rotary crank shaft 28 is shiftable between the positions indicated by lines 72 and 74 in FIGURES 1 and 2. During normal running operation of the offset crank assembly, the axis of the shaft 28 is indicated by line 72, and during rotation of the crank assembly about the axis 72 the wiper blades 38 and 48 are oscillated throughout their running strokes indicated by angles A and B in FIGURE 1. In order to vary the throw of the offset crank assembly so as to achieve depressed parking of the wiper blades 38 and 48, the axis of the crank shaft 28 is shifted from line 72 to line 74 thereby increasing the throw of the crank assembly by shifting the axes of the crank pins to points 58′ and 62′ as seen in FIGURE 3.

As alluded to hereinbefore, it has been the practice to locate the pivot shafts 32 so that there is a slight clearance between the outer ends, or tips, of the wiper blades when they are moved to their depressed parked position thereby assuring that the blades will not interfere with each other during operation. However, in some instances in order to assure a proper field of vision for the driver, the wiped area of the windshield must be increased by utilizing longer wiper blades without changing the location of the pivot shafts and this results in an overlapping wiping pattern at the inboard stroke end of the wiper blades in the center line of the vehicle windshield.

As clearly shown in FIGURE 4, the distance X between the axes of the pivot shafts 32 and 42 is less than the sum of the distance Y, measured from the axis of shaft 32 to the outer end of the wiper blade 38, plus the distance y measured from the axis of the wiper shaft 42 to the outer end of the wiper blade 48. The outer tip of wiper blade 38 describes an arc indicated by line 73 in FIGURE 4 and the outer tip of the wiper blade 48 describes an arc indicated by line 75 in FIGURE 4. The arcs 73 and 75 intersect at the center line of the vehicle windshield, since the pivot shafts 32 and 42 are located on opposite sides of the center line 16 of the vehicle windshield and equidistant therefrom, and produce a doubly wiped area indicated by numeral 76 on the windshield during normal running operation. A second, and larger, area 78 is doubly wiped when the blades 38 and 48 are moved from their inboard stroke end positions to their depressed parked positions.

By way of example only, the blades 38 and 48 may overlap approximately 3½″, or the distance C, as indicated in FIGURES 1 and 4 when they are in their depressed parked positions. In order to prevent interference between the overlapped ends of blades 38 and 48, the geometry of the linkage drive including the offset crank assembly, the connecting links, and the reversing link 52 is such that the lower, or driver's blade 38 has a greater running stroke as indicated by numeral A, than the upper or passenger's wiper blade, which has a running stroke indicated by numeral B. By way of example, the running stroke of the blade 38 may be substantially 96° whereas the running stroke of the passenger's blade may be substantially 89°. Accordingly, in order that the driver's blade 38 be maintained in firm engagement with the lower reveal molding 18 in the depressed parked position, the passenger's blade 48 must have a greater parking angle than the driver's blade 38. Furthermore, since it is desirable to hold the blade in firm engagement with the lower reveal molding 18, the wiper arms 36 and 46 are so connected with their respective wiper shafts, that the throw of the offset crank assembly results in overparking both the driver's blade 38 and the passenger's blade 48. By way of example, the angle D between the inboard stroke end of the driver's blade 38 and the lower reveal molding 18 may be substantially 10°. However, when the axis of the crank shaft 28 is shifted from line 72 to line 74, the driver's blade 38 is moved through an angle of 11°30′ so that the driver's blade is overparked 1°30″. On the other hand, the angle E between the passenger's inboard stroke end of the blade 48 and the wiper blade 38 in the depressed parked position may be on the order of 17° whereas the shifting of the crank shaft 28 results in angular movement of the passenger's blade 48 throughout an angle of 19°. Thus, the passenger's blade is overparked 2° so as to firmly maintain the driver's blade 38 in engagement with the lower reveal molding 18.

In addition, in order to prevent interference between the overlapping blades 38 and 48, the upper blade 48 has a greater angular velocity adjacent the inboard stroke end than adjacent the outboard stroke end. The driver's blade 38, on the other hand, has a minimum angular velocity adjacent each stroke end and a maximum angular velocity in the medial portion of its wiping stroke. The wiper arms and blades are assembled with the wiper shafts when the drive linkage is in the parked position whereas the crank pins 58 and 62 are in the positions indicated by numerals 58′ and 62′ in FIGURE 3.

With particular reference to FIGURE 2, it can be seen that the reversing link, or bellcrank 52, has a leg portion 52a which is connected to the outer end of the connecting link 68 that is shorter than the leg portion 52b which is connected to the arm 50. In addition, the reversing link 52 is so oriented relative to the drive arm 44 so as to obtain the desired velocity of the passenger's blade 48.

With particular reference to FIGURE 5, when the passenger's blade 48 is at the outboard stroke end position as indicated in dotted lines in FIGURE 1, the reversing link 52 is in the position indicated by numeral 52'. The connecting arm is indicated by numeral 50' and the drive arm is indicated by the numeral 44'. At this time, the moment arm, or the distance between the axis of the shaft 54 normal to the connecting arm 50, is indicated by dotted line F. On the other hand, the moment arm between the axis of the wiper shaft 42 and the connecting arm 50 is indicated by the dotted line G.

When the passenger's blade 48 is at the inboard stroke end position as indicated by full lines in FIGURE 1, the reversing link 52 is in the position indicated by numeral 52", while the drive arm 44 is in the position indicated by numeral 44". At this time, the moment arm is between the pivot point 54 and the connecting arm 52", indicated by dotted line H, while the moment arm between the axis of shaft 42 and the connecting arm is indicated by dotted line I. It can be seen that the moment arm of the wiper shaft 42 does not vary appreciably between the inboard and outboard stroke limits. However, the moment arm of the reversing link varies appreciably between the inboard and outboard stroke limits as indicated by lines H and F. More particularly, the moment arm of the reversing link 52 increases from a minimum to a maximum during the movement of the wiper blade from the outboard stroke end to the inboard stroke end, and conversely decreases from a maximum to a minimum during movement of the wiper blade 48 from the inboard stroke end to the outboard stroke end. Thus, the angular velocity imparted to the wiper blade 48 through the connecting arm 50 and the drive arm 44 increases to a maximum adjacent the inboard stroke end position and decreases to a minimum adjacent the outboard stroke end position.

On the other hand, since the transmission, or pivot shaft assembly associated with the driver's blade 38 includes only a simple crank in the form of a drive arm 34, the moment arm remains substantially constant through the stroke of the wiper blade 38, increasing slightly in the medial portion thereof and decreasing adjacent the stroke ends.

With particular reference to FIGURE 4, the geometry of the drive linkage is such that as the lower wiper blade 38 approaches its inboard stroke end position, it moves beneath the upper wiper blade 48, and during the reverse movement, the upper wiper blade 48 moves out of the path of the lower blade 38. Thus, as the lower wiper blade 38 moves towards its inboard stroke end position with the tip describing the arc 73, when the tip is at the point indicated by 9', the tip of wiper blade 48 is at the position of 4'. When the wiper of wiper blade 38 is at the position of 8', the tip of wiper blade 48 is at the position of 3' and when the tip of wiper blade 38 is at position 7' wherein it is moved beneath the blade 48, the lip of the blade 48 is at position 2'. The inboard stroke ends of the blades 38 and 48 are indicated by points 1 and 6, respectively. During outboard movement of the blade 38 from the point 6 to the point 7, the blade 48 moves from the point 1 to the point 2. Thereafter the blade 38 moves from the point 7 to the point 8 and the blade 48 moves from the point 2 to the point 3. In addition, since the blade 48 has a greater angular velocity adjacent the inboard stroke end than the blade 38, the outer tips of blades 38 and 48 will not interfere with each other during operation of the wiping mechanism throughout their running strokes as indicated by angles A and B in FIGURE 1. When the axis of the crank shaft 28 is shifted from the line 72 to the line 74, the wiper blade 38 is moved to its depressed parked position in engagement with the lower reveal molding 18, and the upper wiper blade 48 is moved on top of the lower blade 38 and in firm engagement therewith.

From the foregoing it is apparent that the present invention provides a unique system for increasing the wiped area of a windshield with a pair of conventional asymmetrically oscillated wiper blades by providing an overlapping wiped area together with means for preventing interference between the overlapping wiper blades.

While the embodiment of the invention as herein disclosed constitutes a preferred embodiment, it is to be understood that other forms might be adopted.

What is claimed is as follows:

1. A linkage drive for imparting asymmetrical oscillation to a pair of spaced wiper shafts from a rotary drive member having a crank assembly extending from only one side of said rotary drive member, including, a pair of connecting links having their inner ends rotatably connected to said crank assembly, a pair of spaced wiper shafts, a drive arm attached to each wiper shaft, the outer end of one of said connecting links being operatively connected with one of said drive arms, a bellcrank having a fixed intermediate pivotal support, the outer end of the other connecting link being rotatably connected to one end of said bellcrank, and an arm operatively interconnecting the other end of said bellcrank and the other drive arm whereby rotation of said crank assembly will impart asymmetrical oscillation to said wiper shafts, the geometrical relationship between said bellcrank and said other drive arm being such that the angular movement imparted to the wiper shaft driven by said other drive arm during rotation of said crank arm assembly is less than the angular movement imparted to the wiper shaft driven by said one drive arm.

2. A linkage drive for imparting asymmetrical oscillation to a pair of spaced wiper shafts from a rotary drive member having crank means on only one side thereof, including, a pair of connectiong links having their inner ends rotatably connected to said crank means, a pair of spaced wiper shafts, a drive arm attached to each wiper shaft, an outer end of one of said connecting links being pivotally connected with one of said drive arms, a motion reversing link having a fixed intermediate pivotal support, the outer end of the other connecting link being rotatably connected to one end of said reversing link, and an arm operatively interconnecting the other end of said reversing link and said other drive arm whereby rotation of said crank means will impart asymmetrical oscillation to said wiper shafts, the geometrical relationship between said other drive arm and said reversing link being such that the angular movement imparted to the wiper shaft driven by said one drive arm is greater than the angular movement imparted to the wiper shaft driven by the other drive arm during rotation of said crank means.

3. A linkage drive for imparting asymmetrical oscillation to a pair of spaced wiper shafts from a rotary drive member having crank means on only one side thereof, including, a pair of connecting links having their inner ends rotatably connected to said crank means, a pair of spaced wiper shafts, a pair of wiper arms connected to said wiper shafts, a pair of wiper blades carried by said wiper arms, the distance between each wiper shaft and the outer tip of its wiper blade being more than half the distance between said wiper shafts, whereby said blades provide an overlapping wiped area between said wiper shafts, a drive arm attached to each wiper shaft, the outer end of one of said connecting links being operatively connected with one of said drive arms, a motion reversing link having a fixed intermediate pivotal support, the outer end of the other connecting link being rotatably connected to one end of said reversing link, and an arm operatively interconnecting the other end of said reversing link and said other drive arm whereby rotation of said crank means will impart asymmetrical oscillation to said wiper shafts.

4. The linkage drive set forth in claim 3 wherein said crank means comprises a first crank arm and a second crank arm attached thereto and oriented at a fixed angle relative to said first crank arm.

5. The linkage drive set forth in claim 3 wherein the geometrical relation between said reversing link and said other drive arm is such that the angular movement imparted to the wiper shaft driven by said one drive arm is greater than the angular movement imparted to the wiper shaft driven by the other drive arm.

6. The linkage drive set forth in claim 3 including a bracket for rotatably supporting said other drive arm and said reversing link, the moment arm of said reversing link being variable during rotation for said crank assembly so that the wiper shaft driven by said other drive arm has a nonuniform angular velocity.

7. A linkage drive for imparting asymmetrical oscillation to a pair of spaced wiper shafts from a rotary drive member having crank means on only one side thereof, including, a pair of connecting links having their inner ends rotatably connected to said crank means, a pair of spaced wiper shafts, a pair of wiper arms drivingly connected with said wiper shafts, a pair of wiper blades carried by said wiper arms, the distance between each wiper shaft and the outer tip of the wiper blade carried thereby being more than half the distance between the wiper shafts whereby said blades provide an overlapping wiped area between the wiper shafts adjacent their inboard stroke ends, a drive arm attached to each wiper shaft, the outer end of one of said connecting links being operatively connected with one of said drive arms, a motion reversing link having a fixed intermediate pivotal support, the outer end of the other connecting link being rotatably connected to one end of said reversing link, and an arm operatively interconnecting the other end of said reversing link and said other drive arm whereby rotation of said crank means will impart asymmetrical oscillation to said wiper shafts, said rotary drive member having a shiftable axis for varying the throw of said crank means to move said wiper blades to a despressed parked position.

8. The linkage drive set forth in claim 7 wherein said crank means comprises a first crank arm attached to said drive member and a second crank arm fixedly attached to the outer end of said first crank arm and oriented at an angle thereto.

9. The linkage drive set forth in claim 8 wherein the geometrical relationship between the reversing link and the other drive arm is such that the wiper blade oscillated by the wiper shaft driven by said other drive arm has a smaller running stroke and a larger parking stroke than the wiper blade oscillated by the wiper shaft driven by said one drive arm.

10. In a vehicle, a windshield having a lower reveal molding, a pair of wiper shafts located on opposite sides of the center line of the windshield adjacent the lower reveal molding and spaced equidistantly from the center line of the windshield, a pair of wiper arms drivingly connected with said shafts, a pair of wiper blades carried by said wiper arms, the distance between each wiper shaft and the outer tip of its wiper blade being more than half the distance between said wiper shafts whereby said blades have overlapping paths over the central portion of the windshield, means for imparting conjoint oscillation to said shafts in phase opposition throughout running strokes having predetermined inboard and outboard stroke end positions and for precluding interference between said wiper blades during movement through the overlapping paths of their running strokes, and means for moving said wiper blades throughout parking strokes of different angular extent to depressed parked positions beyond their inboard stroke end positions whereat one of said wiper blades engages said lower reveal molding and the other wiper blade engages said one wiper blade.

11. The combination set forth in claim 10 wherein one of said blades is located above the other blade at their inboard stroke end positions, and wherein the parking stroke of said upper blade is greater than the parking stroke of said lower blade.

12. The combination set forth in claim 10 wherein one of said blades is located above the other blade, and wherein the upper wiper blade has a smaller wiping stroke wiper shafts so that the lower wiper blade is overparked to firmly engage the lower reveal molding and the upper wiper blade is overparked to firmly engage the lower wiper blade and maintain the lower wiper blade in firm engagement with the lower reveal molding.

13. The combination set forth in claim 10 wherein one one of said blades is located above the other blade, and wherein the upper wiper blade has a smaller wiping stroke and a larger parking stroke than the lower wiper blade.

14. Cleaning mechanism for a vehicular windshield including, a pair of wiper shafts located on opposite sides of the center line of the windshield and spaced equidistantly therefrom, a wiper arm drivingly connected to each wiper shaft, a wiper blade carried by each wiper arm, the distance between each wiper shaft and the outer tip of its wiper blade being more than half the distance between the wiper shafts whereby said wiper blades overlapping paths over the central portion of the windshield adjacent their inboard stroke ends, one of said wiper blades being located above the other wiper blade adjacent their inboard stroke ends, means for imparting conjoint oscillation of unequal angular extent to said wiper shafts and said wiper blades in phase opposition and for precluding interference between said wiper blades during movement through their overlapping paths, the lower wiper blade having imparted thereto angular movement of greater extent than the upper wiper blade, the angular velocity of the upper wiper blade being greatest adjacent the inboard stroke end thereof so that the upper wiper blade will move quickly behind and out of the way of the lower wiper blade adjacent its inboard stroke end.

15. The combination set forth in claim 10 wherein one of said wiper blades is located above the other wiper blade, and wherein the angular velocity of the upper wiper blade is a minimum adjacent its outboard stroke end position and a maximum adjacent its inboard stroke end position so that said upper wiper blade will move quickly behind and out of the way of the lower wiper blade adjacent its inboard stroke end position.

16. Cleaning mechanism for a vehicular windshield including, a pair of oscillatable wiper blades, said blades being movable throughout running strokes and to depressed parked positions beyond the inboard stroke end limits of said running strokes, said wiper blades having overlapping paths over the central portion of the windshield during their running strokes and having their inboard stroke end limits angularly offset with respect to each other, means for imparting conjoint oscillation to said wiper blades in phase opposition throughout their running strokes, and means for moving said wiper blades throughout parking strokes of different angular extent to their depressed parked positions.

17. Cleaning mechanism for a vehicular windshield including, a pair of spaced oscillatable wiper blades, said wiper blades being movable throughout running strokes and to depressed parked positions beyond the inboard stroke end limits of said running strokes, said wiper blades having overlapping paths over the central portion of the windshield during their running strokes and having their inboard stroke end limits angularly offset with respect to each other, means for imparting conjoint oscillation to said wiper blades in phase opposition throughout running strokes of different angular extent, and means for moving said wiper blades throughout parking strokes of different angular extent to their depressed parked positions.

18. Cleaning mechanism for a vehicle windshield including, a pair of oscillatable wiper blades, said wiper blades being movable throughout running strokes and to depressed parked positions beyond the inboard stroke end limits of said running strokes, said wiper blades having overlapping paths over the central portion of the windshield during their running strokes and having their inboard stroke end limits angularly offset with respect to each other, means for imparting conjoint oscillation to said wiper blades in phase opposition throughout running strokes of different angular extent including a rotary crank means, a pair of spaced wiper shafts, a drive arm attached to each wiper shaft, a pair of link members having their outer ends operatively connected to said drive arms and means operatively connecting the inner ends of said link members with said rotary crank means, and means for moving said wiper blades throughout parking strokes of different angular extent to their depressed parked positions.

19. Cleaning mechanism for a vehicular windshield including, a pair of wiper shafts located on opposite sides of the center line of the windshield, a wiper arm drivingly connected to each wiper shaft, a wiper blade carried by each wiper arm, the distance between each wiper shaft and the outer tip of its wiper blade being more than half the distance between the wiper shafts whereby said wiper blades have overlapping paths over the windshield adjacent their inboard stroke ends, one of said wiper blades being located above the other wiper blade adjacent their inboard stroke ends, means for imparting conjoint oscillation in phase opposition and for precluding interference between said wiper blades during movement through their overlapping paths, the angular velocity of the upper wiper blade being greatest adjacent the inboard stroke end thereof so that the upper wiper blade will move quickly behind and out of the way of the lower wiper blade adjacent its inboard stroke end.

References Cited by the Examiner
UNITED STATES PATENTS

| | | | |
|---|---|---|---|
| 2,691,186 | 10/1954 | Oishei et al. | 15—250.8 |
| 2,753,023 | 7/1956 | Marvin | 15—255 X |
| 2,753,721 | 7/1956 | Latta | 15—250.17 |
| 2,825,919 | 3/1958 | Horton | 15—253 |
| 2,977,623 | 4/1961 | Schmitz | 15—250.17 X |

FOREIGN PATENTS

| | | |
|---|---|---|
| 1,162,314 | 4/1958 | France. |
| 734,423 | 4/1943 | Germany. |
| 411,012 | 6/1945 | Italy. |

CHARLES A. WILLMUTH, *Primary Examiner.*

J. O'KEEFE, ROBERT W. JENKINS,
*Assistant Examiners.*